US012174591B2

(12) United States Patent
Rossier et al.

(10) Patent No.: US 12,174,591 B2
(45) Date of Patent: Dec. 24, 2024

(54) METHOD FOR MANUFACTURING TIMEPIECE COMPONENTS FOR TIMEPIECES

(71) Applicant: Universo SA, La Chaux-de-Fonds (CH)

(72) Inventors: Gérard Rossier, La Chaux-de-Fonds (CH); Marie Baudoz, Morteau (FR); François-Xavier Dubus, Le Russey (FR)

(73) Assignee: Universo SA, La Chaux-de-Fonds (CH)

(*) Notice: Subject to any disclaimer, the term of this patent is extended or adjusted under 35 U.S.C. 154(b) by 434 days.

(21) Appl. No.: 17/233,691

(22) Filed: Apr. 19, 2021

(65) Prior Publication Data

US 2021/0356912 A1 Nov. 18, 2021

(30) Foreign Application Priority Data

May 18, 2020 (EP) .................................... 20175197

(51) Int. Cl.

*A44C 27/00* (2006.01)
*G04B 19/06* (2006.01)
*G04D 3/00* (2006.01)

(52) U.S. Cl.

CPC ........... *G04D 3/0048* (2013.01); *G04B 19/06* (2013.01); *G04D 3/0092* (2013.01); *Y10T 29/49583* (2015.01)

(58) Field of Classification Search

CPC .. G04D 3/0048; G04D 3/0092; G04D 3/0051; G04D 3/0272; G04D 3/0069; G04B 19/06; G04B 45/0076; G04B 19/103; G04B 19/10; Y10T 29/49583

See application file for complete search history.

(56) References Cited

U.S. PATENT DOCUMENTS

| | | | | |
|---|---|---|---|---|
| 2009/0129210 | A1* | 5/2009 | Yamaguchi | H01L 31/02167 368/205 |
| 2018/0217558 | A1* | 8/2018 | Furusato | G04B 37/22 |
| 2019/0278230 | A1 | 9/2019 | Trotta et al. | |

FOREIGN PATENT DOCUMENTS

| | | | | |
|---|---|---|---|---|
| CH | 574 631 | B5 | 4/1976 | |
| CH | 8916/73 | A4 | 7/1977 | |
| CH | 891673 | | 7/1977 | |
| CH | 598 636 | B5 | 5/1978 | |
| CH | 598636 | A * | 5/1978 | G04D 3/0051 |
| CH | 639 523 | A3 | 11/1983 | |
| CH | 712 655 | A2 | 1/2018 | |
| CH | 717012 | B1 * | 7/2021 | A44C 27/007 |
| CN | 209155126 | U | 7/2019 | |
| CN | 110231769 | A | 9/2019 | |
| CN | 110268337 | A | 9/2019 | |
| DE | 24 06 476 | A1 | 1/1975 | |

(Continued)

OTHER PUBLICATIONS

English translation of CH-598636-A (Year: 1978).*

(Continued)

*Primary Examiner* — Jun S Yoo

(74) *Attorney, Agent, or Firm* — Oblon, McClelland, Maier & Neustadt, L.L.P.

(57) ABSTRACT

A method for manufacturing an applique including an upper surface and a rim intended to be seen by a user, a lower surface for its resting on a dial or a structure of a timepiece and at least one foot protruding from the lower surface, the method making it possible to obtain a varnished applique.

10 Claims, 3 Drawing Sheets

(56) References Cited

FOREIGN PATENT DOCUMENTS

| | | | | |
|---|---|---|---|---|
| EP | 3 537 225 | A1 | | 9/2019 |
| FR | 2 661 136 | A1 | | 10/1991 |
| GB | 2 283 585 | A | | 5/1995 |
| JP | 50-18068 | | | 2/1975 |
| JP | S50-18068 | A | | 2/1975 |
| JP | 5-312976 | A | | 11/1993 |
| JP | 2005274347 | A | * | 10/2005 |
| JP | 2007-286560 | A | | 11/2007 |
| JP | 2019-194296 | A | | 11/2019 |
| JP | 6683882 | B1 | | 3/2020 |
| KR | 10-2017-0037524 | A | | 4/2017 |
| WO | 2019/189483 | A1 | | 10/2019 |

OTHER PUBLICATIONS

English translation of CH-717012-B1 (Year: 2021).*
English translation of JP-2005274347-A (Year: 2005).*
Combined Chinese Office Action and Search Report issued Jun. 1, 2022, in corresponding Chinese Patent Application No. 202110550650.3 (with English Translation and English Translation of Category of Cited Documents) citing documents AO-AU therein, 13 pages.
Japanese Office Action issued Oct. 25, 2022 in Japanese Patent Application No. 2021-072325 (with English translation), citing document 15 therein, 8 pages.
European Search Report issued Nov. 4, 2020 in European Application 20175197.1 filed on May 18, 2020, citing documents AA & AO-AT therein, 8 pages (with English Translation of Categories of Cited Documents & Written Opinion).
Office Action issued Nov. 15, 2023, in corresponding Korean Patent Application No. 10-2021-0063704 (with English Translation), citing document 15 therein, 7 pages.
Japanese Office Action issued in Japanese Patent Application No. 2023-136979 on May 28, 2024, (w/ English Translation), citing references 16-19 therein.

* cited by examiner

METHOD FOR MANUFACTURING TIMEPIECE COMPONENTS FOR TIMEPIECES

CROSS-REFERENCE TO RELATED APPLICATION

This application claims priority to European Patent Application No. 20175197.1 filed on May 18, 2020, the entire disclosure of which is hereby incorporated herein by reference.

FIELD OF THE INVENTION

The present invention relates to a method for manufacturing timepiece components, and more particularly varnished appliques intended to be attached on the dial of a timepiece by means of fixing feet in order to replace all or part of the numerals indicating the hours. Such a method may also be used for the production of dials or bezels.

BACKGROUND OF THE INVENTION

Appliques disposed on the hour-circle, or on secondary dials, are most often produced by tracing, or even by silkscreen by giving the impression of having been printed. Timepiece appliques are essential elements of a timepiece, in particular of a watch, by contributing to giving it a particular physiognomy. Consequently, their execution must be particularly meticulous, highly reproducible, and devoid of any surface condition defect. A perfect execution is made difficult by the very small size of these appearance components, and by their difficult gripping. Consequently the reject rate may be high. This manufacturing is even more tricky when the appliques have a coating such as varnish or lacquer, in order to obtain a particular aesthetic effect. In the case of varnished appliques, it is known to deposit the applique on a support and apply a varnish layer thereto. It is understood that, in this case, varnish is deposited both on the applique and on the support. A join then forms between the applique and the support by capillary action, the appearance is then poor which is unacceptable.

SUMMARY OF THE INVENTION

One aim of the present invention is to overcome all or part of the previously mentioned drawbacks by providing a method for manufacturing high-quality timepiece appliques by ensuring a perfect surface condition of the visible portions.

To this end, the invention relates to a method for manufacturing appliques that comprises the following steps according to which:

- A base is produced in a metal material, said base having an upper face and a lower face;
- The upper surface and the rim of the applique are machined in the base from the upper face, with a predefined depth-;
- The machined base is washed;
- a varnish, lacquer or paint layer is deposited on the machined upper face of the base so as to cover the upper face;
- The varnish layer deposited is dried;
- A glue layer is deposited on the upper face of the base, over at least the entire machining depth, said glue layer being superimposed on the varnish layer, and the glue is dried;
- The lower surface and the foot of the applique are machined via the lower face of the base with a depth greater than the thickness of the base less the machined depth of the upper face, the applique thus formed held in the glue layer;
- The base is plunged into a bath in order to dissolve the glue and release the applique;
- The applique is packaged in view of its delivery.

In accordance with other advantageous variants of the invention:

- The manufacturing method comprises a step of buffing the upper surface and the rim of the applique machined in the base, in order to guarantee a homogeneous removal of the varnish layer and eliminate sharp edges that let a lightening of the colour appear;
- The buffing is followed by a step of electrolytic leaching of the base in order to ensure the cleanliness of the support;
- The varnish layer has a thickness between 20 μm and 100 μm;
- The varnish layer is dried preferably at 80° C. for 30 min, then at 140° C. for 60 min;
- The base is made of a metal material such as brass, aluminium, copper or a precious metal;
- The glue layer is dried in a stove preferably at 45° C. for 5 hours;
- The ungluing bath of the base is carried out in a basket;
- A step of surfacing the glue layer is performed in order to obtain a reference surface for the dimensional during the machining of the lower face;
- The machining of the applique via the lower face of the base is carried out under said at least one covering element and with dimensions slightly greater than the rim of the applique;
- At least one foot is formed for the applique at the same time as the machining via the lower face of the base in order to form the lower face of the applique.
- The invention also relates to a watch comprising at least one applique in accordance with the invention.

Thanks to these features, such a method for manufacturing a timepiece applique makes it possible to obtain appliques rapidly whilst having a perfect surface condition of the visible parts.

SUMMARY DESCRIPTION OF THE DRAWINGS

Other features and advantages of the invention will become more apparent upon reading the following description of a particular embodiment of the invention, given by way of simple illustrative and non-limiting example, and the appended figures, wherein.

DETAILED DESCRIPTION OF PREFERRED EMBODIMENTS

Figure 1:
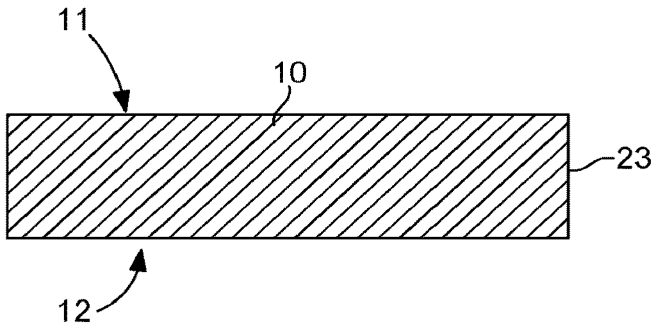
FIGS. 1 to 6 illustrate various steps of the manufacturing method in accordance with the invention.
Figure 2:
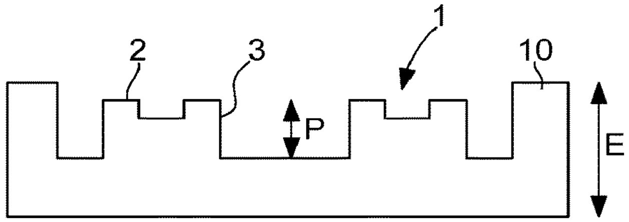
Figure 3:
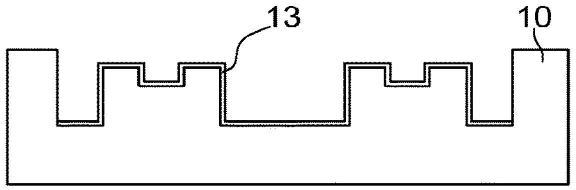
Figure 4:
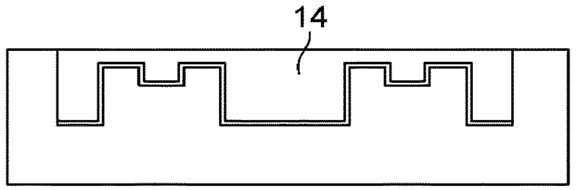
Figure 5:
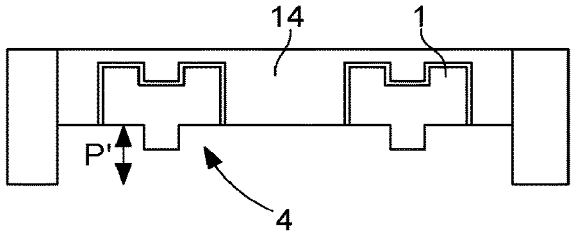
Figure 6:
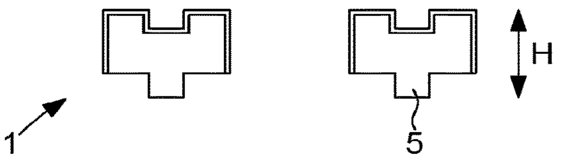
Figure 7:
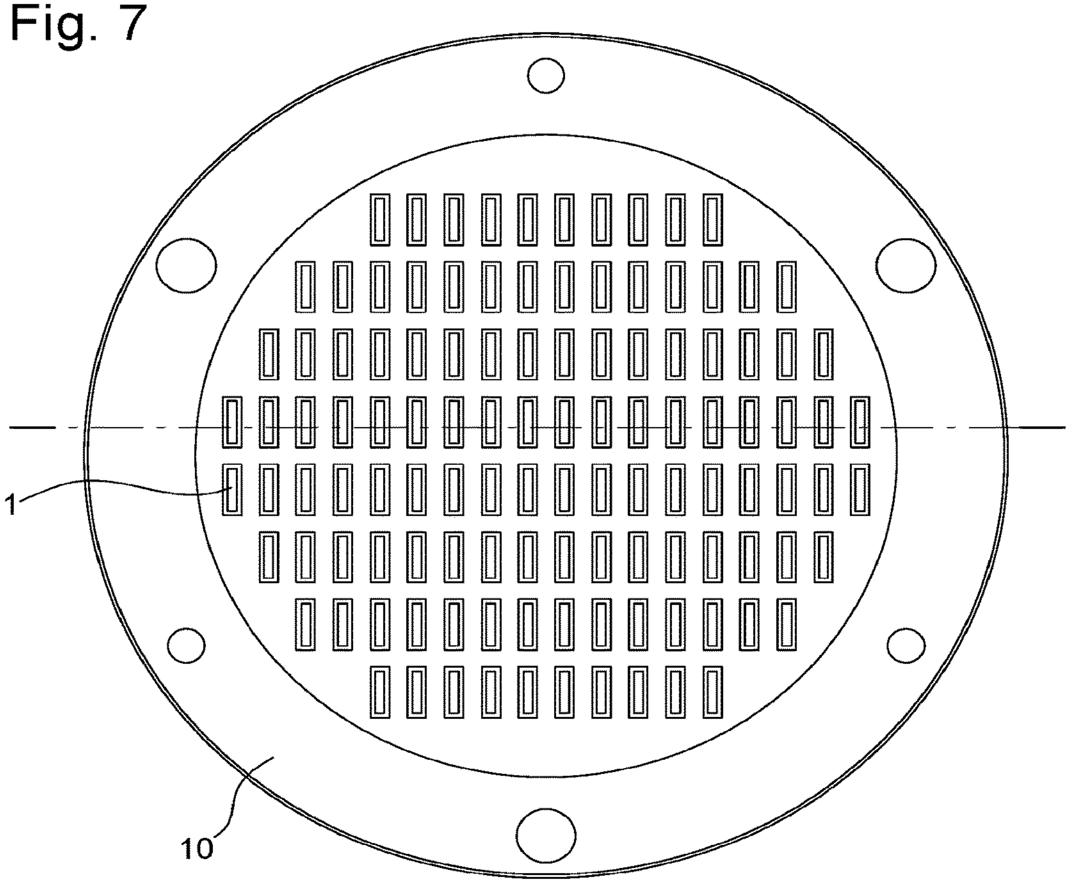
FIG. 7 is a top view of a base of which the upper face has been machined.
Figure 8:
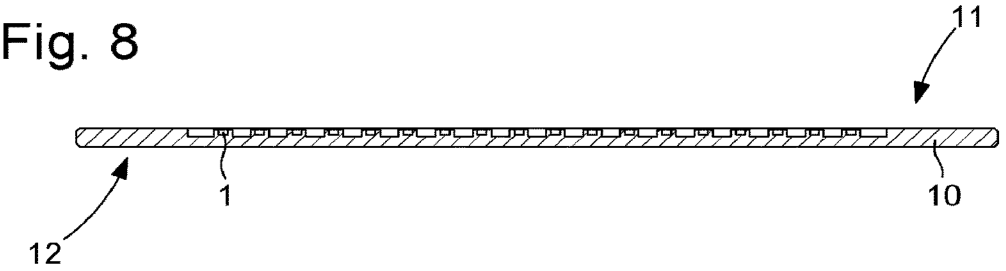
FIGS. 8 and 9 are respectively sectional views of a base machined via the upper face, and of a base having received a varnish layer.
Figure 9:
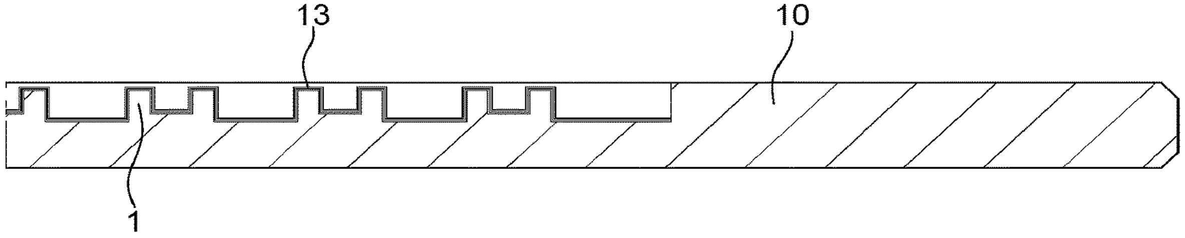
Figure 10:
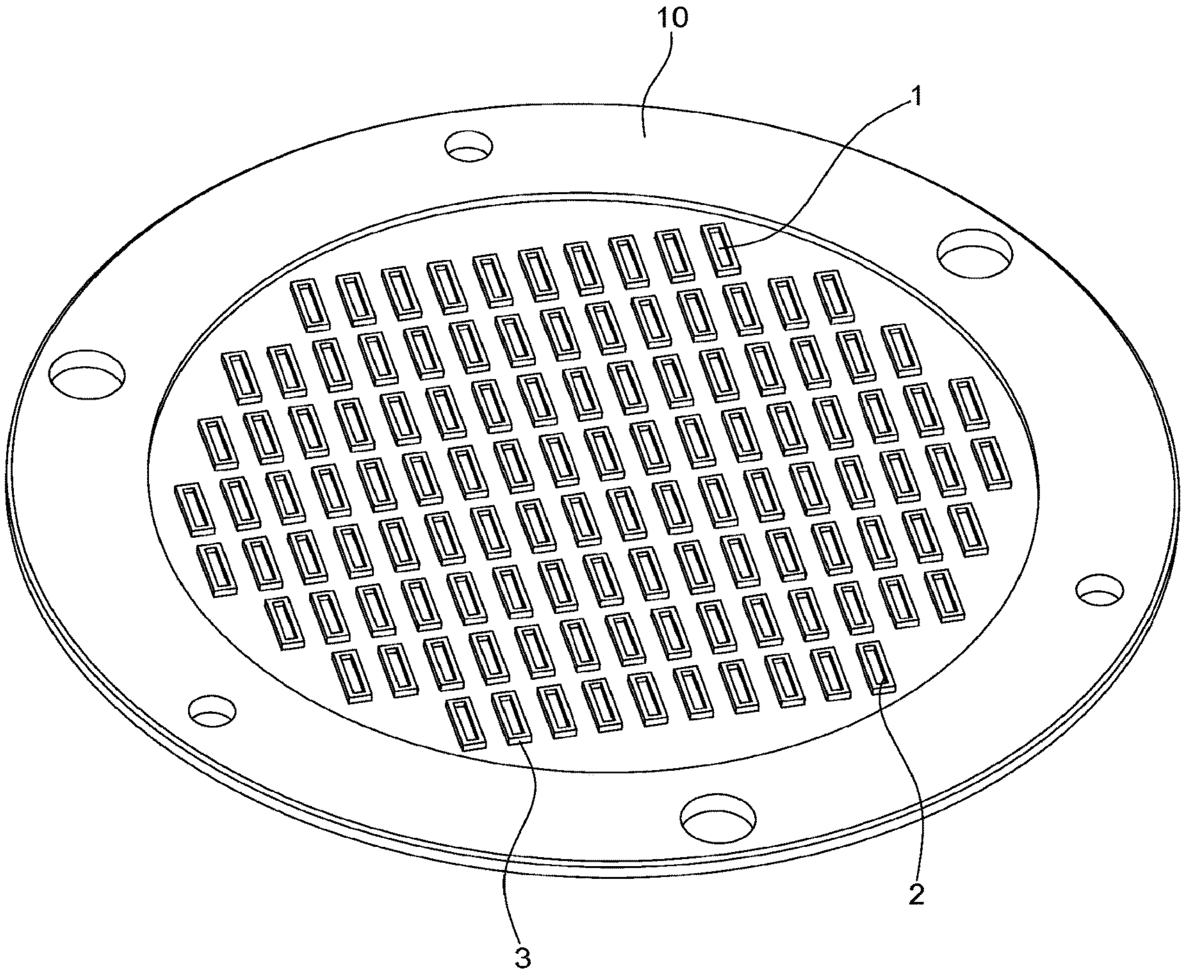
FIG. 10 is a perspective view of a base machined via the upper face.

The invention relates to a method for manufacturing a timepiece applique 1.

"Applique" means any display or decoration element intended to be seen by a user, such as a sign, index, numeral, logo, monogram, or similar, placed on an object, particularly a dial, a collar, a plate, a bridge, or similar.

Such an applique 1 usually includes an upper surface 2 and a rim 3 intended to be seen by a user, a lower surface 4 for its resting on a dial or a structure of a timepiece.

If this lower surface 4 can be glued directly on such a dial or such a structure, it generally includes at least one foot 5. Each foot 5 is protruding from this lower surface 4, and more particularly but not limited to according to a particular orientation in the space in relation to the lower surface 4, for its fastening on such a dial or such a structure.

According to the invention, for the manufacturing of such an applique 1, the following steps are performed successively:

- a base 10 is produced in a metal material, said base having an upper face 11 and a lower face 12;
- the upper surface 2 and the rim 3 of the applique 1 are machined in the base from the upper face, with a predefined depth P-;
- the machined base 10 is washed;
- a varnish layer 13 is deposited on the machined upper face of the base 10 so as to cover the upper face;
- the varnish layer 13 deposited is dried;
- a glue layer 14 is deposited on the upper face of the base 10, over at least the entire machining depth, the glue layer 14 being superimposed on the varnish layer 13, and the glue is dried;
- the lower surface 4 and the foot 5 of the applique 1 are machined via the lower face 12 of the base 10 with a depth P' greater than the thickness E of the base less the machined depth P of the upper face, the applique thus formed being held in the glue layer;
- the base 10 is plunged into a bath in order to dissolve the glue and release the applique 1;
- the applique 1 is packaged in view of its delivery.

The machining of the upper surface 2 and of the rim 3 by a CNC machine for producing the upper surface 2 and the rim 3, may be, depending on the case, performed on a single tool, or even on a plurality of tools, each specific to an operation for machining a particular surface. The machining may obviously implement various technologies, combined or not, and not limited to: milling, grinding, electroerosion, laser, or other.

Naturally the upper surface 2 and the rim 3 of the applique 1 may be more or less complex, and include for example a plurality of elementary surfaces such as flat facets, or other. According to the complexity of the upper surface, the machining and/or the diamond polishing of the upper surface 2 is performed with a machining and/or diamond polishing unit moveable along at least 5 axes in relation to the base.

The base 10 is produced from a metal material or metal alloy such as brass, aluminium or a precious metal. The base 10 is also used as support for the applique 1 during the manufacturing process until the lower surface 4 and the foot 5 are machined.

According to a particular feature of the invention, the machining of the upper surface 2 and of the rim 3 of the applique 1 in the base 10 is carried out from the upper face of the latter, the machining having a predefined depth P. Advantageously, the depth P of the machining is provided greater than the final height H of the applique 1.

According to a particular feature of the invention, after the production of the upper surface 2 and of the rim 3, the machined base 10 is washed via ultrasound washing, such as to eliminate all of the dust and residues related to the machining and to prevent any defect in the varnish layer.

More particularly, according to a particular feature of the invention, a buffing of the upper surface 2 and of the rim 3 of the applique 1 machined in the base 10 is carried out so as to polish the edges of the applique and improve the covering power of the varnish.

A new washing step is carried out after the buffing, the base is then washed by way of electrolytic leaching.

According to one variant of the invention, the base may receive a surface treatment in order to promote the resistance of the varnish layer, such a treatment may consist of a sanding or plasma operation for example. A new washing step may then be necessary in order to eliminate the impurities present.

According to a particular feature of the invention, a varnish layer 13 is deposited on the machined upper face of the base 10 so as to cover the upper face of the base, and implicitly the upper surface 2 and the rim 3 of the applique 1. The varnish layer is deposited by way of a spraying operation, a hardening of the base may also be carried out. The varnish layer has a sufficient thickness for covering the applique, typically the thickness is between 20 μm and 100 μm.

Then, this varnish layer 13 is dried in a stove at 80° C. for 30 min, then at 140° C. for 60 min. Two-step drying makes it possible to obtain a slow and regular polymerisation and thus a better homogeneity of the thickness of the varnish. Obviously, the parameters of this drying step may be varied according to the specificities requested by the manufacturer.

According to a particular feature of the invention, a glue layer 14 is deposited on the upper face of the base 10, the glue layer 14 then being superimposed on the varnish layer 13 and envelopes the upper surface 2 and the rim 3 of the applique 1. Advantageously, the glue layer 14 is deposited over at least the entire depth of the machining, or even slightly more so as to exceed the plane formed by the upper face of the base. Preferably, a water-base glue of Prolaq® type is used to prevent damaging the varnish during the dissolution of the glue in a subsequent step.

The following step consists of drying the glue layer 14 deposited, for this the base coated with glue is placed in a stove at 45° C. for at least 5 hours.

Once the glue layer 14 has dried, an optional levelling step is carried out. The glue layer is machined by way of surfacing for example, so as to obtain a uniform layer, to accelerate the release of the applique at the end of the method, and to form a flat reference surface for the dimensional during the machining of the lower face According to a particular feature of the invention, the lower surface 4 and the foot 5 of the applique 1 are machined via the lower face 12 of the base 10. This machining is carried out over a depth P' greater than the thickness E of the base 10 less the machined depth P of the upper face, namely $P'>(E-P)$.

The machining of the applique 1 via the lower face of the base is carried out at dimensions slightly greater than the rim 3 of the applique 1 so as to separate the applique from the base, the applique thus formed no longer being connected to the base 10 and then only being held by the glue layer 14 deposited previously.

According to a particular feature of the invention, the base is plunged into an aqueous solution in order to dissolve the glue and release the applique from the glue layer. The bath of the base 10 in the solution is performed in a basket in order to be able to easily recover the released applique.

In the case described here, the liquid solution used is an alkaline aqueous solution in order to dissolve the glue, the base 10 being plunged into a succession of leaching baths at 55° C. for 60 min so as to ensure a good dissolution of the glue. Obviously other liquid solutions may be used depending on the glue chosen, just like the leaching time and the temperature of the aqueous solution may vary depending on the glue used.

Lastly the applique may be washed once again in order to remove any glue residues, then dried. The applique may also receive other decorative treatments such as the deposition of a luminescent material.

Finally, the applique is packaged on a storage pallet in view of its delivery.

The invention also relates to a watch comprising at least one applique 1

Of course, the present invention is not limited to the example illustrated and is susceptible to various variants and modifications that will become apparent to the person skilled in the art.

NOMENCLATURE

1. Applique,
2. Upper surface,
3. Rim,
4. Lower surface,
5. Foot
10. Base,
11. Upper face,
12. Lower face,
13. Varnish layer,
14. Glue layer,
E. Base thickness,
H. Applique height,
P,P. Machining depth.

The invention claimed is:

1. A method for manufacturing an applique, the applique includes an upper surface and a rim intended to be seen by a user, a lower surface for its resting on a dial or a structure of a timepiece and at least one foot protruding from said lower surface, the method comprising:

producing a base in a metal material, said base having an upper face and a lower face;

machining the upper surface and the rim of the applique in the base from the upper face, with a predefined depth P;

washing the machined base;

depositing a varnish layer on the machined upper face of the base so as to cover the upper face, the upper surface and the rim of the applique;

drying the varnish layer;

depositing a glue layer on the upper face of the base, over at least the entire machining depth, said glue layer being superimposed on the varnish layer, and the glue is dried;

machining the lower surface and the at least one foot of the applique via the lower face of the base to a depth P', the depth P' is greater than a total thickness E of the base less the machined depth P of the upper face, wherein a depth of the at least one foot is less than the depth P';

plunging the base into a bath of a liquid solution in order to dissolve the glue and release the applique;

packaging the applique in view of its delivery.

2. The manufacturing method according to claim 1, further comprising the steps of:

trimming the upper surface and the rim of the applique machined in the base;

electrolytic leaching the base.

3. The manufacturing method according to claim 1, wherein the varnish layer has a thickness between 20 μm and 100 μm.

4. The manufacturing method according to claim 1, wherein the varnish layer is dried at 80° C. for 30 min, then at 140° C. for 60 min.

5. The manufacturing method according to claim 1, wherein the base is made of a metal material such as brass, aluminium or a precious metal.

6. The manufacturing method according to claim 1, wherein the glue layer is dried in a stove at 45° C. for five hours.

7. The manufacturing method according to claim 1, wherein the bath of the base is carried out in a basket.

8. The manufacturing method according to claim 1, further comprising surfacing the glue layer in order to obtain a uniform thickness.

9. The manufacturing method according to claim 1, wherein the machining of the applique via the lower face of the base is carried out under said varnish layer and with dimensions slightly greater than the rim of the applique.

10. The manufacturing method according to claim 9, wherein at least one foot is formed for the applique at the same time as the machining via the lower face of the base in order to form the lower face of the applique.

* * * * *